United States Patent [19]

Friar et al.

[11] 4,279,644
[45] Jul. 21, 1981

[54] RECOVERY OF SILVER FROM PHOTOGRAPHIC PROCESSOR EFFLUENTS

[75] Inventors: Lawrence B. Friar, Yorklyn; Kenneth M. Smith, Newark, both of Del.

[73] Assignee: E. I. Du Pont de Nemours and Company, Wilmington, Del.

[21] Appl. No.: 157,456

[22] Filed: Jun. 6, 1980

[51] Int. Cl.³ ............................................. C22B 11/04
[52] U.S. Cl. ................................ 75/118 P; 134/64 P; 354/277
[58] Field of Search .................. 78/108, 118 R, 118 P

[56] References Cited

U.S. PATENT DOCUMENTS

| | | | |
|---|---|---|---|
| 2,507,175 | 5/1980 | Pool | 75/108 |
| 3,334,995 | 8/1967 | Gaspar | 75/118 P |
| 3,660,079 | 5/1972 | Govani | 75/118 P |
| 3,982,932 | 9/1976 | Korosi | 75/118 R |
| 4,078,916 | 3/1978 | Gerber | 75/118 P |
| 4,131,455 | 12/1978 | Edwards | 75/118 R |
| 4,150,977 | 4/1979 | Phillips | 75/118 P |

OTHER PUBLICATIONS

Cook et al., in *Journal of Applied Photographic Engineering,* vol. 5, No. 3, Summer 1979, pp. 144–147.
"Silver Recovery from Spen Photographic Fixers Using Vensil", (Brochure) Ventron Corp., Lynn, Massachusetts (no date).

*Primary Examiner*—Brian E. Hearn

[57] ABSTRACT

Wash-off effluent from a photographic film processor is desilvered by a continuous process, employing the following sequence of steps:
1. Addition of anti-foaming agent.
2. Acidification.
3. Chemical reduction of ionic silver to metallic silver by sodium borohydride in alkaline solution.
4. Addition of one of more fluocculants.
5. Passage through hold-up tank to allow time for flow formation.
6. Filtration through automatic gravity filtration device or its equivalent.

An apparatus for the treatment process is also provided.

6 Claims, 1 Drawing Figure

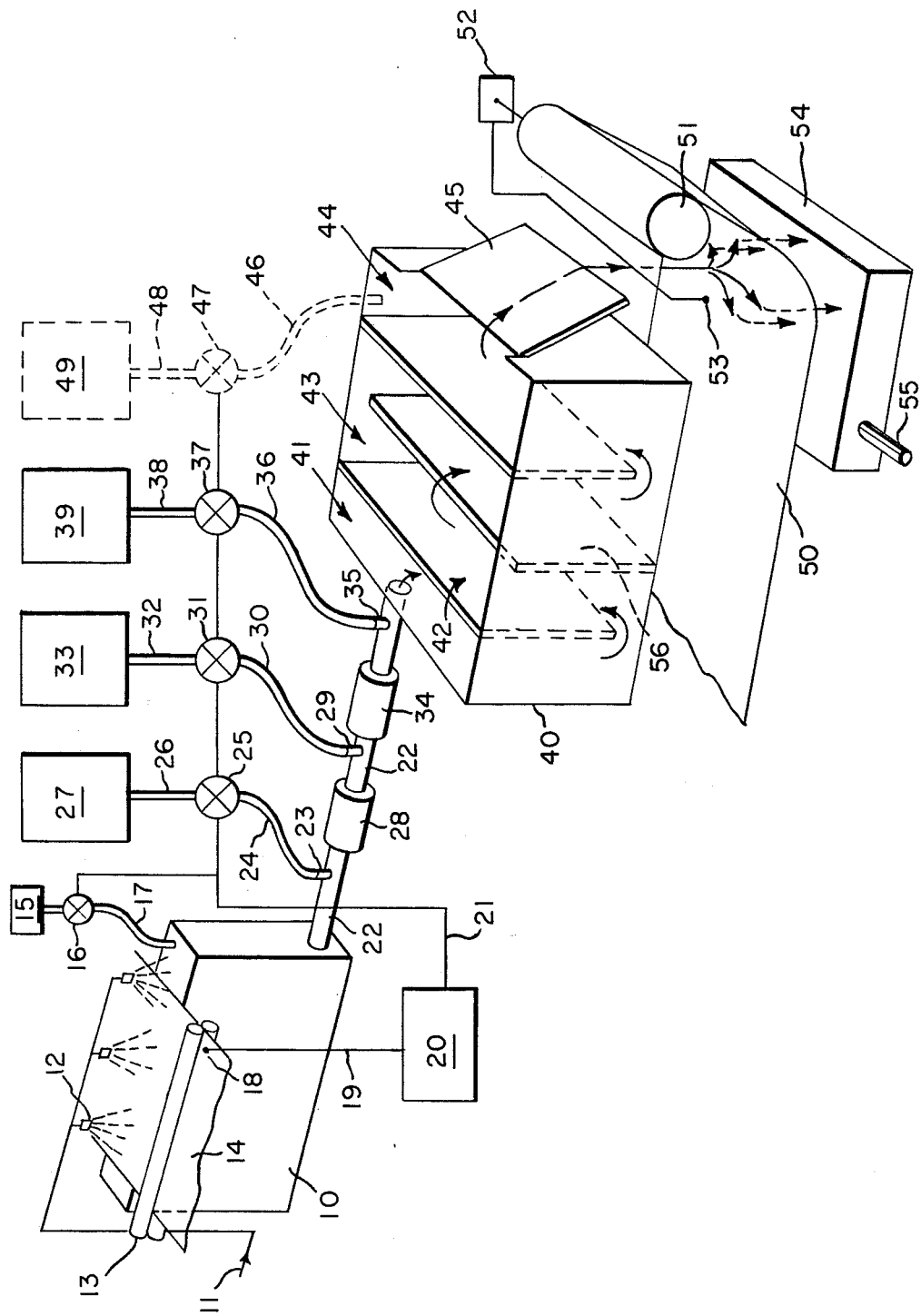

RECOVERY OF SILVER FROM PHOTOGRAPHIC PROCESSOR EFFLUENTS

TECHNICAL FIELD

This invention is directed to a method and associated apparatus for the recovery of silver from photographic processor effluent. More particularly, it is directed to a method of continuous silver recovery from an aqueous dispersion of silver halide and gelatin.

BACKGROUND ART

Processes for the recovery of silver in the photographic industry are well known. They can be divided into two broad categories, one being the recovery of silver from spent fixing solution, the other from the photographic emulsion itself. The use of sodium borohydride as a means of reducing the silver halide is also well known. Customarily, it involves the reaction of sodium borohydride with dispersed silver halide at a pH of between 5.5 and 6.5 to precipitate metallic silver, followed by filtration. In all of the above instances, however, high contents of gelatin are either absent or have been converted into some form amenable to filtering or quick precipitation through the use of enzymes, caustics, sodium hypochlorite, or hydrogen peroxide.

Where there are substantial amounts of gelatin present in the system, as for instance when attempting to recover silver from an aqueous dispersion of a silver halide emulsion rather than a fixing solution, the gelatin rapidly blocks the filter. This is particularly true when a filter with fine enough pores is used to prevent silver losses, thus rendering most conventional techniques impractical. Settling tanks, on the other hand, are cumbersome, so that processes involving precipitation are generally space- and time-demanding. This problem is accentuated when recovery is attempted from processor effluent in instances where a wash-off type film is used, i.e., one where development of an image involves washing off the unexposed, unhardened emulsion with a spray of hot water. Typically, water rich in silver halide and gelatin is washed down the sewer at a rate of 5 to 8 gal/minute, often in contravention of local pollution control laws, always with a waste of a precious metal.

The object of the present invention is to provide an inexpensive, easily implemented, continuous process for removing the silver salts from the effluent of a film processor, together with the gelatin, along with a compact apparatus to implement this process.

DISCLOSURE OF THE INVENTION

Wash-off aqueous effluent from a film processor, rich in silver and gelatin, is rapidly, simply, and inexpensively treated, the silver recovered, and the wash effluent cleaned and brought into compliance with antipollution regulations by a continuous process comprising (1) adding an antifoaming agent to the film processor, (2) acidifying the wash-off effluent to a pH of about 3 through the metered addition and thorough mixing therewith of a prediluted aqueous acid solution, (3) adding to said acidified solution, with mixing, a prediluted alkaline solution of sodium borohydride, the resulting effluent pH being between 6 and 7, to reduce the silver compounds, (4) flocculating the reduced silver by adding to the effluent at least one flocculant and providing a reaction/holding vessel for the resulting flocculate, and (5) continuously filtering the flocculated effluent; whereby silver, silver salts, and gelatin are continuously separated and held in the filter, and substantially silver-free water is discarded. In a variation of the above process, two flocculants may be used, preferably of successive low and high molecular weight, one added just prior to the entry of the effluent into the reaction/holding vessel, the second in the vessel itself, preferably near the exit.

In another embodiment, the invention provides an apparatus for carrying out the above process.

DESCRIPTION OF DRAWINGS

The single FIGURE of drawing is a perspective view of an apparatus suitable for the recovery of silver from a wash-off photographic processor effluent in accordance with this invention.

DETAILED DESCRIPTION OF INVENTION

The silver-containing effluent already referred to consists principally of hot water which has been sprayed over a processed film surface to wash off a gelatino-silver halide emulsion from that surface. Typical silver halides would include silver chloride, silver bromide, bromochloride, iodobromide, or the like. As a result of the spraying activity and the presence of gelatin in the wash-off effluent, the effluent tends to develop a substantial amount of foam, which greatly hinders the recovery process, particularly the separation and precipitation of the silver salts. For this reason, it is essential to introduce an antifoam agent to the processor before treatment of effluent commences. Any antifoam agent may be used which works well in gelatin systems. Suitable antifoaming agents include the butyl esters of polybasic acids, e.g., butyl citrate and tri-n-butyl phosphate. One such product is Foamex®, produced by Glyco Chemicals of Greenwich, Conn. Most silicones are effective, including G. E. Antifoam 60® and Dow-Corning 200 Fluid®, a dimethyl polysiloxane. However, silicones tend to coat machine parts and filter media; they work best in batch systems rather than continuous flow systems, hence are not suitable for the present invention. Among the alcohols, n-amyl alcohol works but has an objectionable odor. Whatever the specific agent used, the amounts employed should be adequate to substantially eliminate all foam at this stage of the process.

Following addition of the antifoam agent, the effluent will typically have a pH of about 8–10. In order to reduce this to a pH of about 3, preferably 2–3, a prediluted aqueous acid solution is injected into the effluent and thoroughly mixed, using an in-line static mixer such as the Koch static mixer developed by the Sulzer Brothers of Winterthur, Switzerland, or its equivalent. The Koch static mixer basically comprises a baffle installed in a pipe, which develops a controlled turbulent flow, resulting in intimate mixing of fluids in the pipe. Other types of mixers are, of course, acceptable, the only requirement being that they achieve intimate mixing of the effluent with the acid solution.

A number of acids may be used, both organic and inorganic acids. The ideal acid serves two purposes. It reduces the pH to an optimum (2–3) for the sodium borohydride reaction and it tends to "salt out" colloids, making them more filterable. Of the common commercial acids, acetic acid does not take the pH low enough. Hydrochloric acid tends to form silver chloride and also attacks stainless steel. Acids which may be used include nitric, sulfuric, be increased, most of the silver particles would escape with the gelatin.

To overcome this problem, a flocculant is added. Selection of flocculant is largely empirical. Since colloidal particles typically carry an electric charge, the flocculant should have the opposite charge. In this photographic system, a cationic (positively charged) flocculant is required. In some instances, two flocculants are added, the first one of low molecular weight at a concentration in the reaction/holding tank of about 1 gram per liter. The second flocculant has the same electric charge but high molecular weight, and is employed at a final concentration of 0.5–1 milligram per liter. These flocculants include materials such as acrylamide-acrylic acid resins, polyquarternary amines, modified polyacrylamides, etc. Commercially, they are available as Nalco 8101 ®, Diamond Shamrock 216-L ®, and a series of American Cyanamid Magnafloc ® products such as 507C, 515C, 572C and 2535C. The preferred primary flocculant is Magnafloc ® 515C, a polyamine. Typically, less than 7.5% by weight of the original silver remains in the effluent, and in such form that a secondary filtration can readily recover up to 99.9% of the original silver content.

Referring to the apparatus shown in the drawing, the process of the invention begins in the processor effluent tank 10 of a wash-off photographic film processor. In this film processor, water supplied from source 11 is sprayed through a plurality of spray nozzles 12 onto a running length of wash-off type photographic film 14 supplied by roller 13. All of the aforementioned elements comprise prior art and have been included here to indicate the location and manner in which the apparatus of this invention is connected to existing equipment.

The apparatus of this invention comprises at least four and possibly five, solution-containing tanks indicated by the numerals 15, 27, 33, 39 and, optionally, 49. Tank 15 contains the antifoam agent and is connected through metering pump 16 and hose 17 to processor tank 10. A pipe 22, preferably made of PVC material, connects the processor tank 10 to reaction/holding tank 40.

A first T-junction 23 is provided along the length of this pipe 22. A hose 24 connects T-junction 23 to metering pump 25, which is connected through hose 26 to the second tank 27 which contains prediluted acid. Static mixer 28, which is a mixer of the type described previously, throughly mixes the acid stream introduced at T-junction 23 with the effluent flowing in pipe 22. Thereafter, a second T-junction 29, connected through hose 30, metering pump 31, and hose 32 admits caustic sodium borohydride solution from tank 33. Static mixer 34 immediately downstream from T-junction 29 provides thorough mixing of the sodium borohydride stream with the acidified effluent in pipe 22. A third T-junction 35 connected through hose 36, metering pump 37, and hose 38 admits the flocculant from tank 39 to pipe 22.

Pipe 22, as noted previously, terminates in reaction/-holding tank 40, which in one specific embodiment is a 30-gallon tank. Tank 40 is divided into compartments 41, 42, 43 and 44 by the use of baffles, generally illustrated by baffle 56. These baffles are so arranged as to develop a serpentine path for the liquid entering tank 40 through pipe 22. Thus, the liquid entering compartment 41 flows lactic, citric, and phosphoric. The selection was based on an extension of the Hofmeister or lyotropic series of anions:

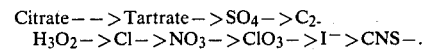

The most effective anions are of multiple charge, and phosphoric acid has been found most effective. Predilution is preferred because it simplifies measuring and control. Example: 135 ml of commercial phosphoric acid, 85% strength, is diluted with water sufficient to make up 10 liters.

Following the acidification step, sodium borohydride is injected into the effluent in quantities sufficient to reduce the silver halide to metallic silver, and to raise the pH of the effluent to between 6 and 7, preferably about 6.4. Commercial sodium borohydride is manufactured and marketed by Ventron Corp., Andover Street, Lynn, Mass., as VenSil ®, a 12% water solution in 50% sodium hydroxide solution. This solution may be injected directly into the effluent and mixed by means of an in-line static mixer of the type described above. Again, the choice of mixer itself is not critical, the only requirement being that it achieve intimate mixing of the effluent with the sodium borohydride solution in as short a time as practical, especially where a continuous process is contemplated.

At this stage, the silver will start to slowly precipitate. Filtration at this point is impractical due to the high content of gelatin in the effluent, and the small size of the silver particles. If filtration were attempted in a filter system having small enough pores to remove the silver, the gelatin would rapidly clog them, rendering the filter useless. Were the pore size to under the first of the three baffles 56 into compartment 42. It then overflows the second of the three baffles 56 and flows into tank 43 before again passing under the third baffle 56 into tank 44, wherefrom it overflows and slides over inclined plane 45 prior to dropping onto filter web 50. Inclined plane 45 is useful in preventing breaking of the floc which has developed during passage of the fluid through the serpentine path of tank 40. In a typical system operating at a flow rate of 5 gallons per minute, it takes about 6 minutes for the fluid entering tank 40 through pipe 22 to exit over inclined plane 45.

The filtering unit illustrated in the drawing is a commercial automatic filtering unit wherein filter web 50 is a fabric web supplied from a roll 51 driven by a motor 52 which is controlled by a sensor 53. The function of sensor 53 is to detect the amount of liquid stagnant on top of the filter web 50 and to automatically advance the filter web by 3 to 4 inches to remove used sections of the filter, thus providing fresh filter fabric under the inclined plane 45. The used portion of the filter web 50, i.e., the portion covered by sludge comprising silver and gelatin, is collected in a tray (not shown) for further disposition. Silver may be recovered from the sludge by burning off the filter and the gelatin in the presence of a flux, or by using any other silver recovery technique known in the art. Clean effluent passes through the filter web 50 as shown by the arrows in the drawing, it is collected in a tray 54 and then, through connection 55, may be either directed to a second filtration unit not shown or to the sewer. Such second filtration unit may be any conventional unit, including centrifugal or cartridge-type filters.

The automatic filtering unit preferred is one known as the "automatic gravity filtration system," produced by SERFILCO, wherein the filter fabric is available in a range of porosity of 1–125 microns. In this invention, 10 and 20 micron fabric both work well. However, any similar filter arrangement is acceptable since, at that point, the action of the flocculant has developed a floc which can be redily filtered through a 10 micron pore size filter.

If a second flocculant is desired, a fifth tank, tank 49, may be connected through hose 48, metering pump 47, and hose 46 to the fourth compartment of tank 40, compartment 44, for addition just prior to filtration.

An electronic detector 18 may be employed to detect the presence of film in the processor and, through connector 19, to actuate electronic controller 20 which may be connected through line 21 to the metering pumps 16, 25, 31, 37 and, optionally, 47. Thus, electronic controller 20 permits the operation of the pumps only when photographic film is being processed in the processor, so as to conserve use of chemicals. It may also incorporate a timer which allows the metering pumps to operate for a short period of time following the exit of film 14 from the wash-off stage of the processor, thus allowing time for treatment of any silver and gelatin-containing effluent still remaining in the tank 10.

The foregoing process and apparatus permits continuous desilvering of wash-off effluent as fast as the film processor generates it. It also helps meet sewer code requirements. The untreated effluent is alkaline, but after treatment it is approximately neutral and essentially free of gelatin and silver.

Using the apparatus described above, the following example describes the typical implementation of the process of this invention:

EXAMPLE

Effluent flows from a wash-off film processor at about 5.5 gallons per minute. Treatment chemicals are added as follows:
- A. Foamex Antifoam, 1.25 cc per minute full strength.
- B. Phosphoric acid, 85%. Dilution: 135 ml to 10 liters with water. This solution added at a rate of 300 ml per minute.
- C. Sodium borohydride (VerSil ®). Dilution: 145 ml to 10 liters of water. This solution added at a rate of 300 ml per minute.
- D. MAgnafloc ® 515C. Dilution: 900 ml to 10 liters of water. This solution added at a rate of 300 ml per minute.

36" wide Contact Wash-Off Film generated effluent with a silver concentration of 34.5 mg/l. After treatment and filtering through 10μ filter medium, the silver concentration was 2.6 mg/l. The percentage removal was therefore $$(34.5-2.6)/34.5 \times 100 = 92.5\%.$$

When the treated effluent, at 2.6 mg/l of silver, was put through a 0.45μ polishing filter, the silver concentration dropped to 0.03 mg/l. This is 99.9% removal. Chemical analysis also revealed that the treated effluent contained its silver with the following distribution:
- 2.2 mg/l as particles larger than 0.45
- 0.4 mg/l as particles smaller than 0.45μ, dissolved silver, or the combination of both.

A chemical assay on a typical piece of filter fabric showed a silver content of 2.3% by weight. This converts to 8.5 troy ounces per 1,000 square feet and is comparable to the silver content of many photographic films. The silver-bearing fabric is therefore of interest to reclaimers and other companies in the precious metals business. The fabric can be sold directly to them for its silver content.

We claim:

1. In a process wherein silver is recovered from photographic wash-off film processor effluent containing silver halide and gelatin by chemically reducing ionic silver to metallic silver by reaction with an alkaline solution of sodium borohydride and subsequent filtration, the improvement comprising continuously adding an antifoaming agent to the wash-off effluent, acidifying the effluent to a pH of about 3 by addition of a prediluted aqueous acid solution, followed by mixing the acid with the effluent in a first static mixer, adding a prediluted alkaline solution of sodium borohydride in an amount sufficient to precipitate silver from the effluent, followed by mixing in a second static mixer, adding a flocculant to the effluent stream, passing the resulting stream to a holding/reaction vessel in order to complete flocculation, and continuously discharging the contents of said vessel to a filter, whereby the silver and gelatin are retained on the filter.

2. The process of claim 1 wherein the addition of said aqueous acid solution reduces the pH of the effluent to 2–3.

3. The process of claim 1 wherein the acid employed in the prediluted aqueous acid solution is phosphoric, lactic, or sulfuric acid.

4. The process of claim 1 wherein the silver and gelatin are separated from the effluent at the same rate that they are generated in the film processor.

5. The process of claim 1 wherein the filter is a filter web of fine mesh filter fabric.

6. The process of claim 5 wherein the filter web is advanced from a supply roll at a rate sufficient to replace with fresh filter surface those portions of the web which are loaded with gelatin-silver floc.

* * * * *

UNITED STATES PATENT OFFICE
CERTIFICATE OF CORRECTION

PATENT NO. : 4,279,644　　　　　　　　　　　　　Page 1 of 6
DATED : July 21, 1981
INVENTOR(S) : Lawrence B. Friar and Kenneth M. Smith It is certified that error appears in the above–identified patent and that said Letters Patent are hereby corrected as shown below:

Cover sheet under "Other Publications" line 3 "Spen" should be --Spent--

Cover sheet under "Abstract", line 10, "flow" should be --floc--.

Col. 3, line 1 "sulfuric" ends our page 4; same line "be increased" is beginning of our page 6.

Col. 3, line 66, "flows" ends our page 7; "lactic" begins our page 5.

Col. 4, line 32, "to" ends our page 5; "under" begins our page 8.

Col. 3, line 1 to Col. 4, line 32 have not taken the pages of the specification in sequence. The patent should read as follows:

--include nitric, sulfuric, lactic, citric, and phosphoric. The selection was based on an extension of the Hofmeister or lyotropic series of anions:

$$Citrate \longrightarrow Tartrate \longrightarrow SO_4 \longrightarrow C_2H_3O_2^- \longrightarrow Cl^- \longrightarrow NO_3^- \longrightarrow ClO_3^- \longrightarrow I^- \longrightarrow CNS^-.$$

The most effective anions are of multiple charge, and phosphoric acid has been found most effective. Predilution is preferred because it simplifies measuring and control. Example: 135 ml of commercial phosphoric acid, 85% strength, is diluted with water sufficient to make up 10 liters.

UNITED STATES PATENT OFFICE
CERTIFICATE OF CORRECTION

PATENT NO. : 4,279,644
DATED : July 21, 1981
INVENTOR(S) : Lawrence B. Friar and Kenneth M. Smith It is certified that error appears in the above-identified patent and that said Letters Patent are hereby corrected as shown below:

Following the acidification step, sodium borohydride is injected into the effluent in quantities sufficient to reduce the silver halide to metallic silver, and to raise the pH of the effluent to between 6 and 7, preferably about 6.4. Commercial sodium borohydride is manufactured and marketed by Ventron Corp., Andover Street, Lynn, Massachusetts, as VenSil®, a 12% water solution in 50% sodium hydroxide solution. This solution may be injected directly into the effluent and mixed by means of an in-line static mixer of the type described above. Again, the choice of mixer itself is not critical, the only requirement being that it achieve intimate mixing of the effluent with the sodium borohydride solution in as short a time as practical, especially where a continuous process is contemplated.

At this stage, the silver will start to slowly precipitate. Filtration at this point is impractical due to the high content of gelatin in the effluent, and the small size of the silver particles. If filtration were attempted in a filter system having small enough pores to remove the silver, the gelatin would rapidly clog them, rendering the filter useless. Were the pore size to be increased, most of the silver particles would escape with the gelatin.

UNITED STATES PATENT OFFICE
CERTIFICATE OF CORRECTION

PATENT NO. : 4,279,644  Page 3 of 6
DATED : July 21, 1981
INVENTOR(S) : Lawrence B. Friar and Kenneth M. Smith It is certified that error appears in the above-identified patent and that said Letters Patent are hereby corrected as shown below:

To overcome this problem, a flocculant is added. Selection of flocculant is largely empirical. Since colloidal particles typically carry an electric charge, the flocculant should have the opposite charge. In this photographic system, a cationic (positively charged) flocculant is required. In some instances, two flocculants are added, the first one of low molecular weight at a concentration in the reaction/holding tank of about 1 gram per liter. The second flocculant has the same electric charge but high molecular weight, and is employed at a final concentration of 0.5-1 milligram per liter. These flocculants include materials such as acrylamide-acrylic acid resins, polyquarternary amines, modified polyacrylamides, etc. Commercially, they are available as Nalco 8101®, Diamond Shamrock 216-L®, and a series of American Cyanamid Magnafloc® products such as 507C, 515C, 572C and 2535C. The preferred primary flocculant is Magnafloc® 515C, a polyamine. Typically, less than 7.5% by weight of the original silver remains in the effluent, and in such form that a secondary filtration can readily recover up to 99.9% of the original silver content.

Referring to the apparatus shown in the drawing, the process of the invention begins in the processor effluent tank 10 of a wash-off photographic film processor. In this film processor, water supplied from source 11 is sprayed through a

UNITED STATES PATENT OFFICE
CERTIFICATE OF CORRECTION

PATENT NO. : 4,279,644
DATED : July 21, 1981
INVENTOR(S) : Lawrence B. Friar and Kenneth M. Smith It is certified that error appears in the above-identified patent and that said Letters Patent are hereby corrected as shown below:

plurality of spray nozzles 12 onto a running length of wash-off type photographic film 14 supplied by roller 13. All of the aforementioned elements comprise prior art and have been included here to indicate the location and manner in which the apparatus of this invention is connected to existing equipment.

The apparatus of this invention comprises at least four and possibly five, solution-containing tanks indicated by the numerals 15, 27, 33, 39 and, optionally, 49. Tank 15 contains the antifoam agent and is connected through metering pump 16 and hose 17 to processor tank 10. A pipe 22, preferably made of PVC material, connects the processor tank 10 to reaction/holding tank 40.

A first T-junction 23 is provided along the length of this pipe 22. A hose 24 connects T-junction 23 to metering pump 25, which is connected through hose 26 to the second tank 27 which contains prediluted acid. Static mixer 28, which is a mixer of the type described previously, thoroughly mixes the acid stream introduced at T-junction 23 with the effluent flowing in pipe 22. Thereafter, a second T-junction 29, connected through hose 30, metering pump 31, and hose 32 admits caustic sodium borohydride solution from tank 33. Static mixer 34 immediately downstream from T-junction 29 provides

UNITED STATES PATENT OFFICE
CERTIFICATE OF CORRECTION

PATENT NO. : 4,279,644

DATED : July 21, 1981

INVENTOR(S) : Lawrence B. Friar and Kenneth M. Smith

It is certified that error appears in the above-identified patent and that said Letters Patent are hereby corrected as shown below:

thorough mixing of the sodium borohydride stream with the acidified effluent in pipe 22. A third T-junction 35 connected through hose 36, metering pump 37, and hose 38 admits the flocculant from tank 39 to pipe 22.

Pipe 22, as noted previously, terminates in reaction/holding tank 40, which in one specific embodiment is a 30-gallon tank. Tank 40 is divided into compartments 41, 42, 43 and 44 by the use of baffles, generally illustrated by baffle 56. These baffles are so arranged as to develop a serpentine path for the liquid entering tank 40 through pipe 22. Thus, the liquid entering compartment 41 flows under the first of the three baffles 56 into compartment 42. It then overflows the second of the three baffles 56 and flows into tank 43 before again passing under the third baffle 56 into tank 44, wherefrom it overflows and slides over inclined plane 45 prior to dropping onto filter web 50. Inclined plane 45 is useful in preventing breaking of the floc which has developed during passage of the fluid through the serpentine path of tank 40. In a typical system operating at a flow rate of 5 gallons per minute, it takes about 6 minutes

UNITED STATES PATENT AND TRADEMARK OFFICE
CERTIFICATE OF CORRECTION

PATENT NO. : 4,279,644

DATED : July 21, 1981

INVENTOR(S) : Lawrence B. Friar and Kenneth M. Smith

It is certified that error appears in the above-identified patent and that said Letters Patent is hereby corrected as shown below:

for the fluid entering tank 40 through pipe 22 to exit over inclined plane 45.

Signed and Sealed this

Twenty-first Day of December 1982

[SEAL]

Attest:

Attesting Officer

GERALD J. MOSSINGHOFF

Commissioner of Patents and Trademarks